Patented June 7, 1938

2,119,551

UNITED STATES PATENT OFFICE 2,119,551

MAKING ALUMINA AND POTASSIUM SULPHATE

Florence B. MacCarthy, Philadelphia, Pa., assignor to Olcott Payne, Philadelphia, Pa.

No Drawing. Application April 14, 1936.
Serial No. 74,389

11 Claims. (Cl. 23—121)

The present invention relates to producing valuable products from alunite, and the entire process involves first roasting the alunite at a temperature not substantially above 750° C., said alunite preferably being in a suitably comminuted form, then while in a suitable receptacle, treating the roasted material with sulphuric acid in excess, which acid may be at a temperature of about 210° C., and may be of a concentration around 50° Bé., and allowing the materials to react hot until the whole has been rendered soluble, which may require about 2 hours. The mixture will then consist largely of potassium sulphate and aluminum sulphate, the latter being in substantial excess over the former. Then potassium sulphate is added to bring the molecular ratio of potassium sulphate to aluminum sulphate up to approximately 1:1, water being added to bring the density of the mass down to about 30° Bé., from which solution (after filtration, if desired) a large amount of the potassium sulphate and aluminum sulphate will crystallize out in th form of potash alum, and for this purpose the solution is preferably rapidly cooled in order to produce small crystals, say from pinhead size up to about half inch size. During the crystallization of the alum, the impurities in the solution do not crystallize out, with the alum, to any large extent. And particularly this holds good when the crystals are small.

Most of the above steps, taken separately, are old, having been heretofore suggested in the art.

It is well known that alum crystals, when sufficiently heated, will liberate $SO_3$ (the latter usually being decomposed, at least largely, into a mixture of $SO_2$ and O) whereby a mixture of alumina and potassium sulphate will remain, if the temperature of the heating is properly controlled, and not allowed to go too high. However it is well known that difficulty has been experienced in endeavoring to heat alum crystals alone, in a relatively large mass, on account of the crystals melting in their own water of crystallization, and in order to prevent this, I mix with the crystals a fine material which is non-fusible at temperatures to be used in the process, and which will not constitute an impurity in the material after the heat treatment. Such a material as finely divided aluminum oxide or any oxide of a metal of the third group of the periodic system is very suitable. Alternatively, partly calcined alum crystals, or potassium sulphate may be mixed with the alum and heated as hereinafter described. It seems possible that the alumina and equivalent substances may, to some extent, function as catalysts in the decomposition, since the alum is more rapidly decomposed to alumina with evolution of oxides of sulphur and without adversely or deleteriously affecting the potassium sulphate.

The mixture of crystals and aluminum oxide or equivalent is then heated in a mass, for example in a pan or muffle, a gentle heat being applied at first, and the heat being gradually increased, after a substantial fraction of the total water of crystallization has been driven off.

The heating operation drives off that portion of the $SO_3$ content of the alum which was initially combined in the alum with aluminum oxide, but does not decompose the potassium sulphate present in the alum. The heating begins to drive off $SO_2$ and $SO_3$ when a temperature of about 500° C. is reached, and preferably the heat is run up to about 750° C. at which point it is continued until evolution of $SO_2$ and $SO_3$ (of the aluminum sulphate content of the alum) is substantially complete. In some cases the temperature may even go up to 800° C. during the latter part of the heating operation. This can be done in an enamel-lined retort or pot.

The length of time which the mass must be heated will depend upon numerous factors, such as the shape of the mass, volume, weight and dimensions of the mass and other factors. When heating the material in a pan, as a layer about two feet deep, three hours may be necessary to produce substantially complete decomposition of the aluminum sulphate, and if the mass of material in the pan be six feet deep, about nine hours may be necessary. If desired, a gentle current of air or other gases can be introduced into the bottom of the pan in which the heating operation is conducted, or air may be otherwise blown through the mass being heated, during the early part of the heating, which assists in carrying off the water vapor (and which air or gas current, if continued, would assist also in carrying away the oxides of sulphur as produced, and accordingly hastening the decomposition of the aluminum sulphate to some extent). Or partial vacuum could be maintained in the retort in which this is effected, or both partial vacuum and gas current can be used. Agitation of the mass during the heating step may also help to shorten the heating period.

The sulphur dioxide and oxygen, together with any undecomposed $SO_3$ produced can be converted into sulphuric acid in any desired manner, for example in chambers or by a suitable catalytic process or by absorption. Accordingly the sulphuric acid which is so produced and/or recovered, may be employed in subsequent runs of the process.

The hot mass can then be quenched with water. The calcined material, which now consists of potassium sulphate and alumina can be leached out with water, to form a solution of potassium sulphate, either cold or hot water being used, preferably hot. The potassium sulphate solution can be concentrated and the potassium sulphate can be crystallized out, or a portion of the potassium sulphate solution can be used for diluting the material resulting from the treatment of the roasted alunite with sulphuric acid.

The quenching and leaching operations can be combined by dumping the calcined material, while still hot, into the leaching water, and this can be combined with systematic leaching.

The aluminum oxide residue can be dried, and constitutes a very pure form of aluminum oxide, which can be sold for the making of metallic aluminum or for any other suitable purpose. It is also possible to use a portion of the material after calcination, as the inert material to be added to the crystals of alum in the next batch, instead of aluminum oxide.

The mother liquors and wash water from the various steps in the process can be used in the earlier steps of the process, thereby avoiding the necessity of evaporating large quantities of solutions.

I consider the step of mixing the crystals with powdered aluminum oxide (which does not have to consist wholly of a fine powder but may be partly in powder and partly in granules) or other similar material, whereby the melting of the crystal alum is largely or wholly prevented, to be a most important improvement in the art, and to be the most important novel step of the process. As stated above aluminum oxide powder or granules, as well as the calcined alum itself in finely divided or powdered condition can be used, or other material which is incapable of adding any undesirable impurity. Obviously it would not be feasible to add a material which would introduce an impurity at this stage, unless the said material were something which is to be reacted with the alumina in some subsequent process, in which case of course it would not be considered as an impurity.

I do not restrict myself in the present invention to the treatment of alum produced as herein described, since alum produced in various other ways could be suitably employed.

The crystallization of the alum from its original solution (preferably after filtration) is a step in which care should be exercised, to prevent the formation of large crystals, and also to prevent absorption by the crystals of inert materials or impurities which might be present in the alum solution. If the material is treated as above described, there should be no substantial amount of impurities taken up by the alum, in crystallizing from the solution and particularly if the small crystals of alum are promptly removed from the solution, and are allowed to drain back into the solution. The crystals may be given a slight washing with water if desired, to wash off adherent mother liquor, with the impurities contained therein, and the washings may if desired flow back into the mother liquid. The crystals can also be washed with water containing hydrochloric acid, e. g. a 6.5% aqueous solution of hydrochloric acid) and again with water.

The crystal alum can be recrystallized from water, if desired, to further purify the same.

In carrying out the process, the original ore (i. e. alunite) can be crushed to all pass a one-half inch mesh screen and can be then incinerated or calcined at 750° C., say in a rotary kiln or in other suitable calcining furnace. The gases evolved can be used to make sulphuric acid. The calcined material can then be passed through a roller mill and sent to a bin and allowed to decrepitate for two or three days, during which operation the calcines may break up into a rather fine material.

One part by volume of this decrepitated roasted ore is then placed in a lead-lined steam heated pan, together with one part by volume of acid of the concentration above referred to, or with an equivalent quantity of sulphuric acid of 66° Bé., and sufficient water to dilute the acid to about 50° Bé., the mixture being heated by the steam coils to a temperature above 105° C., and preferably the mixture is constantly stirred, both for the purpose of hastening the reaction and for preventing "freezing" of the mixture (i. e. the formation of a dense hard cake). The reactions may be complete in about three hours. During the heating operation it is preferable to add water or mother liquors from some of the later steps of the process, in order to make up for evaporation losses.

To this product, which then will consist largely of potassium sulphate and aluminum sulphate, a sufficient amount of potassium sulphate is added, to make about one molecule of this for each molecule of aluminum sulphate. There is also added a sufficient amount of water (and/or mother liquors as mentioned above) to bring the solution to about 30° Bé. The hot solution, now at about 30° Bé. is preferably filtered, and is cooled to about 15° C., at which temperature a very large proportion of the aluminum sulphate and potassium sulphate will crystallize in the form of potash alum. The crystals are then promptly removed from the mother liquor.

At this point, I mix the alum crystals obtained as above, with alumina or one of the equivalent materials heretofore disclosed and heat the mixture. In the early part of the heating of the alum (or preferably the mixture of alum with the aluminum oxide added) the same may be first subjected to a heat of about 70° C., for say half an hour, during which time a good deal of water is evaporated, particularly if this heating is done in a well ventilated space or under a vacuum, or if a current of air is led through the mass.

The amount of aluminum oxide to be added to the alum can be varied between rather wide limits, depending upon how fast it is desired to heat the alum, particularly during the first stages of the heating process. About 20 or 25% of the alumina, or about 25 to 30% of the calcined alum residue can be conveniently added to the alum, in this stage, or about 15 to 25% potassium sulphate may be used, or 20 to 30% of a mixture of calcined alum and alumina containing about equal parts of these substances may be used.

It is, of course, readily conceivable that aluminum sulphate may be decomposed by the same process as heretofore described in connection with the decomposition of alum. That is to say aluminum sulphate may be decomposed to yield alumina and $SO_2$ and $O_2$ by heating the same with alumina or one of the above equivalents. The amount of alumina that should be used in decomposing aluminum sulphate in comparison to the amount required to decompose alum (heretofore disclosed) stand in approximately the same ratio as the molecular weights of the two substances. The same proportionality factor governs in connection with the decomposition of aluminum sulphate using burnt alum or any of the above disclosed equivalents.

The amount of alumina or equivalent material must always be sufficient to form a coating base which permits the thorough decomposition of the aluminum sulphate. The amount of such coating base is governed by numerous factors, such as size of particles, rate of evaporation, rate of heating, mass, temperature and other factors contributing thereto.

While not wishing to be bound by any particular theory, the applicant is of the opinion that the alumina or equivalent material forms a coating base.

It will be obvious to those skilled in the art that proportions may be varied and that equivalent material other than those disclosed may be be used in the heating of the alum to produce alumina and potassium sulphate.

The present case covers matter a large part of which was contained in a copending case 683,406, filed August 2, 1933.

I claim:—

1. The method of treating potash alum by decomposing the aluminum sulphate portion of said potash alum by heating crystallized alum in admixture with a pulverulent to granular material selected from the group consisting of alumina and potassium sulphate and mixtures of same and burnt alum, and continuing the heating sufficiently to decompose a large part at least of the aluminum sulphate component of the alum, and thereafter leaching at least a part of the calcined product.

2. A process which comprises mixing potash alum containing water of crystallization, with an added substance which embraces at least one normal constituent of burnt alum and which does not introduce impurities into the mass, and which is in a substantially dry condition, in such amount that when the mixture is heated sufficiently to decompose the alum, said mixture does not liquefy, and then heating the mixture sufficiently to drive out the water and the $SO_3$ content of the aluminum sulphate constituent of the alum, and thereafter leaching at least a portion of the residue of the heating operation.

3. A process as covered in claim 1, in which the crystallized alum is first washed at least once with water and at least once with a hydrochloric acid solution.

4. A process of decomposing alum which comprises heating a mixture of alum crystals with an added reagent comprising fine alumina, to a temperature sufficient to drive out the $SO_3$ that is combined with the alumina, but insufficient to decompose the potassium sulphate, and continuing such heating step until a product consisting essentially of $K_2SO_4$ and $Al_2O_3$ remains, and thereafter leaching at least a portion of such product.

5. A process of decomposing alum which comprises heating a mixture of alum crystals with a coating base comprising calcined alum, consisting essentially of alumina and potassium sulphate, to a temperature sufficient to drive out the $SO_3$ that is combined with the alumina, but insufficient to decompose the potassium sulphate, and continuing such heating step until a product consisting of $K_2SO_4$ and $Al_2O_3$ remains, and thereafter leaching at least a portion of such product.

6. A process of decomposing alum which comprises heating a mixture of alum crystals with potassium sulphate to a temperature sufficient to drive out the $SO_3$ that is combined with the alumina, but insufficient to decompose the potassium sulphate, and continuing such heating step until a product consisting essentially of $K_2SO_4$ and $Al_2O_3$ remains, and thereafter leaching at least a portion of such product.

7. A process which comprises roasting alunite at a low temperature, treating the same, hot, with sulphuric acid until substantially all of the basic alumina constituent has been solubilized, adding water and $K_2SO_4$ to bring up the atomic K:Al ratio to about 1:1 and crystallizing alum from the solution and heating said alum in admixture with a substantially dry substance selected from the group consisting of alumina, potassium sulphate, mixtures thereof and burnt alum, in an amount sufficient to prevent substantial liquefaction of the mass, said heating being to a temperature sufficiently high to convert the alum substantially into $Al_2O_3+K_2SO_4$, and lixiviating at a portion of the latter.

8. The herein described novel intermediate product which consists of a mixture of small alum crystals and an added relatively finely divided solid agent selected from the group consisting of alumina, potassium sulphate, mixtures of said two substances and burnt alum, the amount of said agent being sufficient to prevent fusion of the mixture, when said mixture is calcined, said finely divided solid acting as a coating base on said crystals.

9. The herein described novel intermediate product which consists of a mixture of small alum crystals and an added ingredient comprising fine alumina the latter being in amount sufficient to prevent fusion of the mixture when calcined and acting as a coating base on said crystals.

10. The herein described novel intermediate product which consists of a mixture of alum crystals and an added ingredient comprising burnt alum the latter being in amount sufficient to prevent fusion of the mixture when calcined and acting as a coating base on said crystals.

11. The herein described novel intermediate product which consists of a mixture of small alum crystals and an added ingredient comprising potassium sulphate the latter being in amount sufficient to prevent fusion of the mixture when calcined and acting as a coating base on said crystals.

FLORENCE B. MacCARTHY.